United States Patent
Mills

(10) Patent No.: US 12,487,456 B2
(45) Date of Patent: Dec. 2, 2025

(54) BINOCULAR OPTICAL DISPLAY SYSTEM

(71) Applicant: BAE SYSTEMS plc, London (GB)

(72) Inventor: Rory Thomas Alexander Mills, Rochester Kent (GB)

(73) Assignee: BAE SYSTEMS PLC, London (GB)

( * ) Notice: Subject to any disclaimer, the term of this patent is extended or adjusted under 35 U.S.C. 154(b) by 783 days.

(21) Appl. No.: 17/756,829

(22) PCT Filed: Nov. 19, 2020

(86) PCT No.: PCT/GB2020/052948
§ 371 (c)(1),
(2) Date: Jun. 3, 2022

(87) PCT Pub. No.: WO2021/111102
PCT Pub. Date: Jun. 10, 2021

(65) Prior Publication Data
US 2023/0021349 A1    Jan. 26, 2023

(30) Foreign Application Priority Data

Dec. 6, 2019  (EP) .................................... 19275143
Dec. 6, 2019  (GB) .................................... 1917886

(51) Int. Cl.
*G02B 27/01* (2006.01)
*G02B 17/00* (2006.01)

(52) U.S. Cl.
CPC ....... *G02B 27/0172* (2013.01); *G02B 17/002* (2013.01); *G02B 2027/0132* (2013.01)

(58) Field of Classification Search
CPC ................................................ G02B 27/0172
See application file for complete search history.

(56) References Cited

U.S. PATENT DOCUMENTS 3,923,370 A    12/1975  Mostrom
8,625,200 B2 *  1/2014  Smith ................... G02B 17/06
                                                359/631

(Continued)

FOREIGN PATENT DOCUMENTS

EP    0460983 A1    12/1991
EP    0461942 A1    12/1991

(Continued)

OTHER PUBLICATIONS

International Preliminary Report on Patentability received for PCT/GB2020/052948. Mailed: Jun. 16, 2022. 9 pages.

(Continued)

*Primary Examiner* — Edmond C Lau
(74) *Attorney, Agent, or Firm* — Finch & Maloney PLLC

(57) ABSTRACT

Described herein is an improved optical display system for a head or helmet mounted display (HMD). The optical display system comprises an intermediate reflective element that comprises an array of microstructures. Separate image generators are provided which generate images which are projected onto a user's left and right eyes and by use of the intermediate reflective element, the image generator located on the left side of the HMD generates an image for the user's left eye and the image generator located on the right side of the HMD generates an image for the user's right eye. As described below, this improved optical display system may, in various examples, be coupled with a vision enhancement system.

21 Claims, 12 Drawing Sheets

(56) References Cited

U.S. PATENT DOCUMENTS

| | | | |
|---|---|---|---|
| 2013/0229712 A1 | 9/2013 | Kress | |
| 2016/0161743 A1 | 6/2016 | Osterhout et al. | |
| 2017/0363871 A1 | 12/2017 | Vallius et al. | |
| 2018/0013027 A1 | 1/2018 | Narum et al. | |
| 2019/0064526 A1* | 2/2019 | Connor | G02B 6/0073 |
| 2019/0385342 A1* | 12/2019 | Freeman | G06T 11/00 |

FOREIGN PATENT DOCUMENTS

| | | |
|---|---|---|
| EP | 0726481 A1 | 8/1996 |
| EP | 0650605 B1 | 10/1998 |
| EP | 2947502 A1 | 11/2015 |
| WO | 9104508 A2 | 4/1991 |
| WO | 9216867 A1 | 10/1992 |
| WO | 2021111102 A1 | 6/2021 |

OTHER PUBLICATIONS

International Search Report and Written Opinion received for PCT Application No. PCT/GB2020/052948. Mail date: Feb. 11, 2021. 13 pages.
Extended European Search Report received for EP Application No. 19275143.6, dated Mar. 26, 2020. 8 pages.
Combined Search and Examination Report under Sections 17 and 18(3) received for GB Application No. 2018162.4, dated May 6, 2021. 5 pages.
GB Search Report under Section 17(5) received for GB Application No. 1917886.2, dated Aug. 26, 2020. 4 pages.

* cited by examiner

BINOCULAR OPTICAL DISPLAY SYSTEM

BACKGROUND

FIG. 1A shows an example known type of head or helmet mounted display (referred to collectively as an HMD) 100. There are many applications for such an HMD, including automotive applications, aviation, military applications, engineering, medicine, gaming and any general application for viewing media and the like. FIGS. 1B and 1C show schematic diagrams of the optical arrangement of the HMD 100 shown in FIG. 1A.

As shown in FIGS. 1A and 1B the display (or image generation) optics 102, 102' (e.g. projection optics) for producing an image for each eye 104, 104' are located on the opposite side of the HMD 100. The right hand side display optics 102' transmits light to the left eye 104 via the intermediate mirror 106 and the left hand side display optics 102 transmits light to the right eye 104' via the intermediate mirror 106. For both eyes, the light is reflected off the inside of the visor 108 as is more clearly shown in the side view in FIG. 1C. This arrangement shown in FIGS. 1A-1C is useful as it provides a reduced optical path compared to some other arrangements, thus making for a compact HMD.

In some applications, the HMD may be coupled with an additional vision enhancement system that provides an improved image. For example an image of the external environment to the user. An example of a vision enhancement system is a night vision enhancement system. Typically, a vision enhancement system provides an enhanced image for each eye of the user. As a result the system may comprise a vision enhancement system dedicated to each eye.

Issues may arise when coupling a vision enhancement system with an HMD system. This is particularly the case in an HMD as described above with reference to FIG. 1.

The embodiments described below are not limited to implementations which solve any or all of the disadvantages of known HMDs.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

Described herein is an improved optical display system for a head or helmet mounted display (HMD). The optical display system comprises an intermediate reflective element that comprises an array of microstructures. Separate image generators are provided which generate images which are projected onto a user's left and right eyes and by use of the intermediate reflective element, the image generator located on the left side of the HMD generates an image for the user's left eye and the image generator located on the right side of the HMD generates an image for the user's right eye. As described below, this improved optical display system may, in various examples, be coupled with a vision enhancement system.

A first aspect provides an optical display system comprising: a first image generator for projecting a first image along a first optical path, the first optical path comprising a first region of a surface; a second image generator for projecting a second image along a second optical path, the second optical path comprising a second region of the surface; and an optical element positioned in both the first and second optical paths between the image generators and the surface, wherein: the first image generator is positioned to the left of a central plane passing through the surface; the second image generator is positioned to the right of the central plane passing through the surface; the first and second regions of the surface are reflective and arranged to respectively reflect the light emitted by the first image generator towards a user's left eye position and the light emitted by the second image generator towards the user's right eye position; and the optical element comprises an array of microstructures on a primary surface, each microstructure comprising at least a first facet and a second facet, wherein the first facet from each of a first plurality of the microstructures is arranged to reflect the light emitted by the first image generator and forms part of the first optical path and the second facet from each of a second plurality of the microstructures is arranged to reflect the light emitted by second image generator and forms part of the second optical path.

The surface may be a visor.

The first plurality of microstructures may be the same as the second plurality of microstructures.

At least some of the microstructures may be substantially triangular in cross-section.

At least some of the microstructures may be substantially rectangular in cross-section.

At least some of the shaped microstructures may have a saw-tooth cross-section.

The primary surface of the optical element may have a substantially flat profile.

The substrate of the optical element may have a substantially curved profile.

The optical element may be located in a central portion of the display system between the first and second image generators.

At least one of the first and second image generators may comprise an interface for optically coupling an image from an additional imaging system. The additional imaging system may form part of a vision enhancement system. The vision enhancement system may be a night vision enhancement system.

A field of view of the first image generator may only partially overlap a field of view of the second image generator.

The first and second optical paths may not be symmetrical about the central plane passing through the surface.

A second aspect provides an HMD comprising a display system as described above.

A third aspect provides an optical element for use in an optical display system, the optical display system comprising a first image generator for projecting a first image along a first optical path and a second image generator for projecting a second image along a second optical path, the optical element comprising an array of microstructures on a primary surface, each microstructure comprising at least a first facet and a second facet, and wherein the first facet from each of a first plurality of the microstructures is arranged to reflect light output by the first image generator such that it forms part of the first optical path between the first image generator and a left eye of a user and the second facet from each of a second plurality of the microstructures is arranged to reflect light output by the second image generator such that it forms part of the second optical path between the second image generator and a right eye of a user.

A fourth aspect provides a method, performed by an optical display system, comprising, providing, by a first image generator, a first image for projection along a first optical path to a user's left eye; providing, by a second image generator, a second image for projection along a second optical path to a user's right eye; using an optical element positioned in both the first and second optical paths between the image generators and a surface to reflect the light output from the first image generator and the light output by the second image generator, wherein the optical element comprises an array of microstructures on a primary surface, each microstructure comprising at least a first facet and a second facet, wherein the first facet from each of a first plurality of the microstructures is arranged to reflect the light output from the first image generator and forms part of the first optical path and the second facet from each of a second plurality of the microstructures is arranged to reflect the light output from the second image generator and forms part of the second optical path.

DETAILED DESCRIPTION

Described herein is an improved optical display system for a head or helmet mounted display (HMD). As described below, this improved optical display system may, in various examples, be coupled with a vision enhancement system, e.g. the vision enhancement system may be attached to the optical display system or the optical display system may include the coupled vision enhancement system as an integral part.

In various examples, the vision enhancement system may provide separate (or independent) enhancement for each eye, e.g. a vision enhancement system that comprises a dedicated sensor for each eye to provide enhanced binocular vision. For example, such HMDs could be used by pilots of aircrafts for improving their vision of the external environment, particularly, but not exclusively for enhancing night vision. A pilot is thus enabled to see both the HMD images and the external environment outside the aircraft, even in low or non-existent external lightning conditions.

As with all optical devices, it is important to ensure that the user receives the correct images. This is necessary to ensure that the information received by the user is correct and to mitigate any unpleasant optical effects that may cause eye fatigue or strain. This is particularly the case for any configurations of HMD that provide a binocular image to a user, such as shown in the example of FIG. 1A.

Figure 1A:
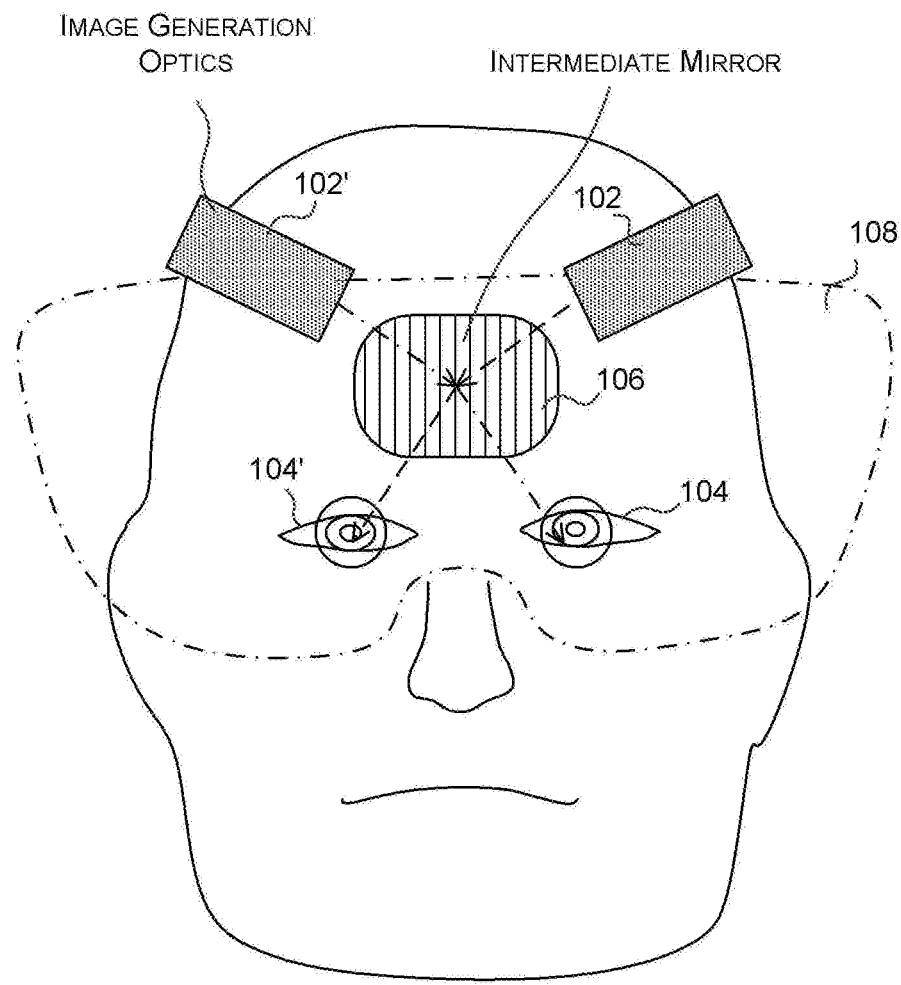
FIGS. 1A, 1B and 1C are schematic diagrams showing a known HMD.
Figure 1B:
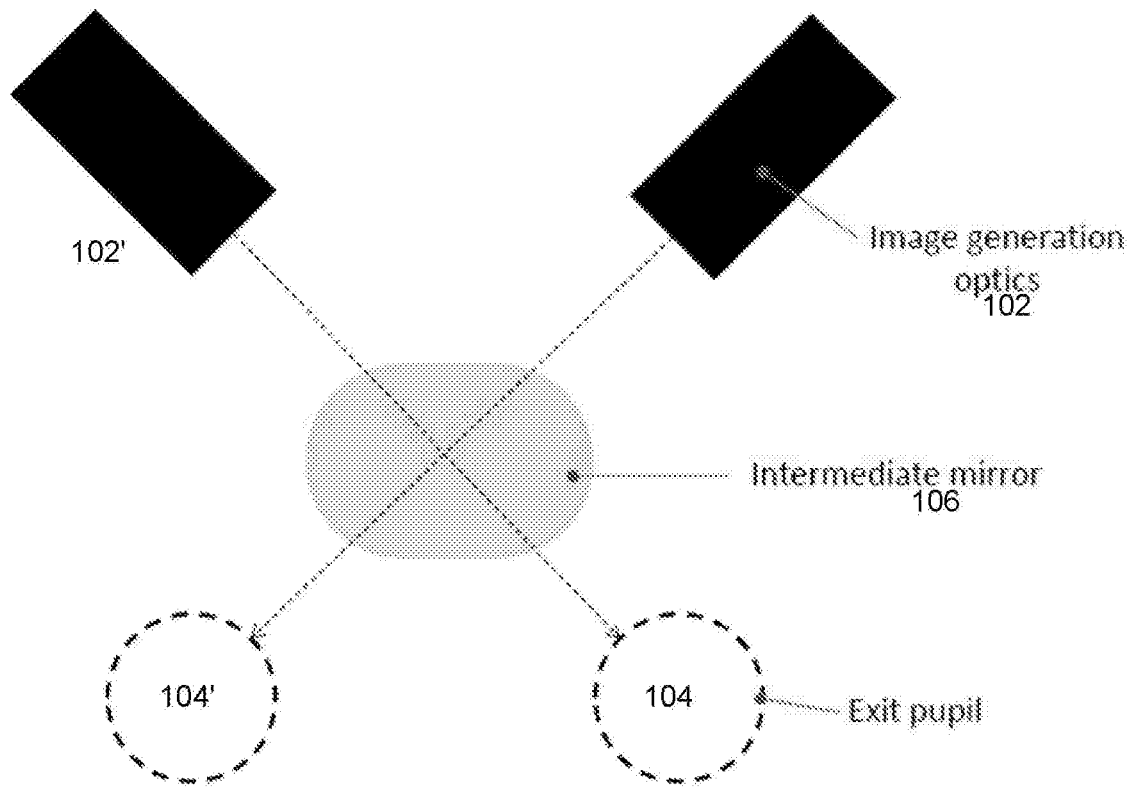
Figure 1C:
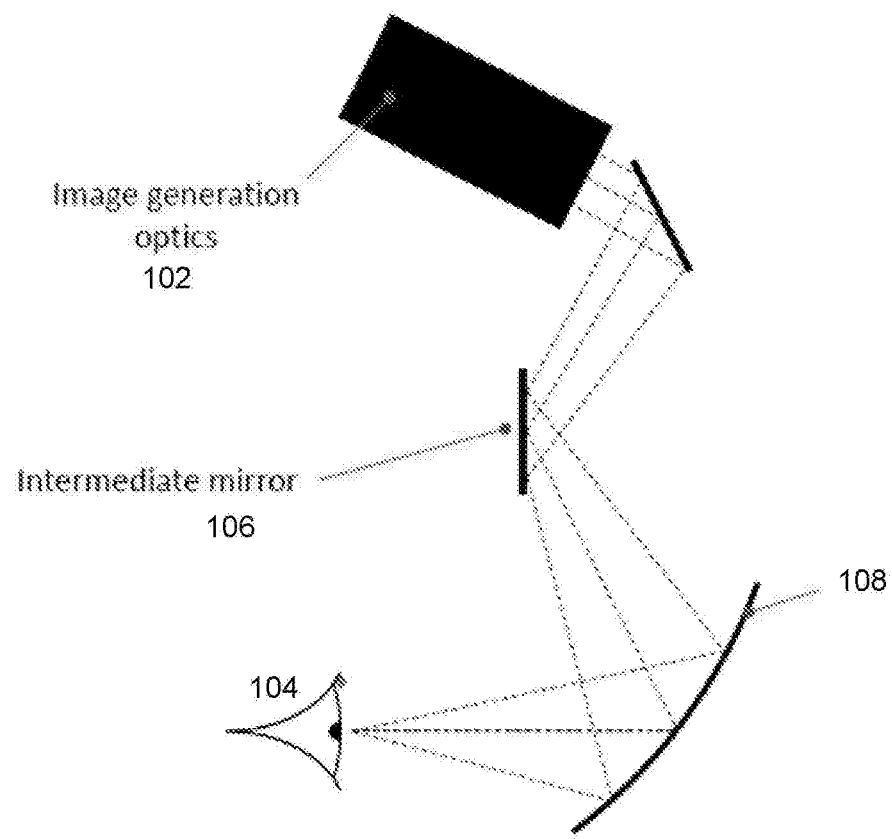

In the HMD shown in FIG. 1A, the intermediate mirror 106, which is located centrally to the HMD and flat to the brow of the user, forms part of both optical paths (and hence there is a common axis of symmetry). This arrangement of the intermediate mirror 106 has the effect of limiting the available folding geometry and in turn limits the ability to adjust the optical configuration of the HMD.

The improved optical display system for an HMD will be described with reference to FIGS. 2A, 2B and 3-7. As described in more detail below, the intermediate mirror in the arrangement of FIG. 1A is replaced by an intermediate reflective element that is a micro-structure element. The use of a micro-structure element enables a more exaggerated folded geometry since the mirrored surface of the intermediate reflective element in each of the optical paths is effectively no longer located flat to the user's brow. Additionally, the micro-structure element may be optimised so that, unlike the arrangement of FIG. 1A, the right-hand image generation optics generate an image which is relayed to the right eye and the left-hand image generation optics generate an image which is related to the left eye. This is particularly useful where there is a vision enhancement system, either optically coupled to or integral with the HMD.

The HMD can display images to the user in any suitable way, including projecting images toward the user's eye via a surface (e.g. a visor). In various examples, the surface (e.g. the visor) may be referred to as a display surface. In various examples, the surface may be positioned substantially in front of the user's eyes. Images may be displayed statically to the user, so that the images are displayed regardless of where the user is looking, or statically relative to the user's environment, so that movements of the HMD and user's head are matched by a corresponding movement of the image. Displaying images statically is useful for symbology and particular operational information within the context of a moving environment such as a vehicle or aircraft. For example, symbology can comprise altitude, directional, or speed information that the user should be aware of at all times. Examples of images that may be displayed statically relative to the user's environment may include landmark information of the external environment.

Figure 2A:
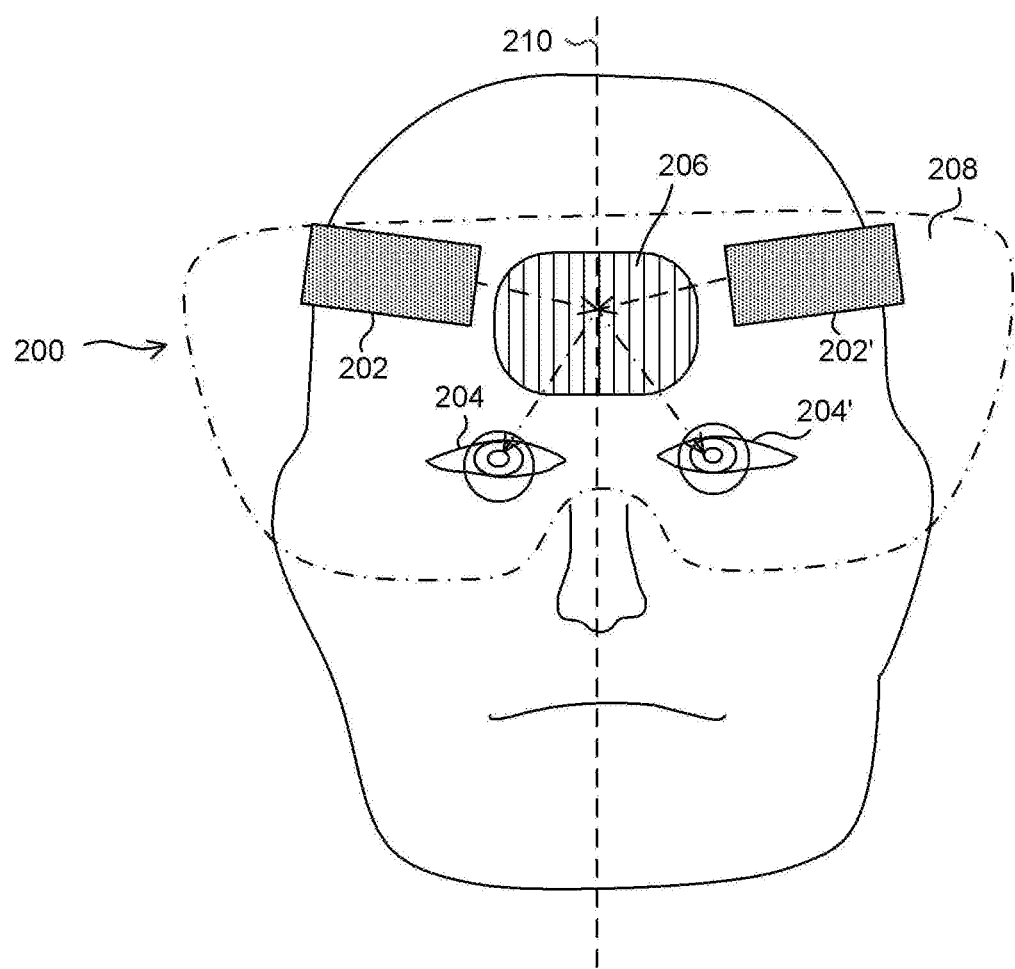
FIGS. 2A and 2B are diagrams showing an HMD comprising an improved optical display system.

FIG. 2A shows an HMD 200 comprising an improved optical display system. The HMD 200 may be of any appropriate type and in various examples is a helmet-based display including a helmet visor. The HMD 200 is wearable (or portable) by means of an appropriate support which is not shown in FIG. 2A (e.g. the support may comprise the helmet itself, earpieces or one or more straps). The support may include a support adapted to support the optical elements in front of the eye.

As shown in FIG. 2A, the optical display system comprises first and second image generators 202, 202', an intermediate reflective element 206 and a surface 208 (e.g. a visor or other eyewear).

Each image generator generates an image that is projected along an optical path towards the eyes 204, 204' of the user. The intermediate reflective element 206 is positioned in both optical paths (i.e. in both a left optical path from the first image generator 202 to the user's left eye 204 and a right optical path from the second image generator 202' to the user's right eye 204'). The optical paths are shown as dotted lines in FIG. 2A.

As shown in FIG. 2A, the first image generator 202 is positioned to the left of a central plane 210 passing through the surface 208 and the second image generator 202' is positioned to the right of the central plane 210 passing through the surface 208.

The intermediate reflective element 206 is a micro-structure element and is positioned in a central portion of the optical display system, i.e. the central plane 210 passing through the surface 208 also passes through the intermediate reflective element 206. The intermediate reflective element 206, whilst still positioned substantially centrally, may be positioned slightly to the left or right such that the central plane 210 does not pass through the centre of the intermediate reflective element 206. The substantially central positioning of the intermediate reflective element 206 facilitates the folding of the optical paths and thus makes the optical display system compact.

The intermediate reflective element 206 may be reflective such that the reflections are chromatically independent. Reflective structures may enable high efficiency over a wide range of wavelengths compared to diffractive structures. In some examples the intermediate optical element 206 may have a reflectively over 90%. In some examples it may be over 95%, and preferably over 99%.

The surface 208 is formed from a substantially transparent medium such that the user is able to view the exterior environment through the surface, as well as viewing any image relayed to the eyes of the user in use via the optical display system (with or without a vision enhancement system). The surface 208 may be planar or may be curved (e.g. a spherical visor). In various examples, the surface 208 may be the visor of a helmet-mounted display. The surface 208 is arranged to reflect the light emitted from both the left-hand and right-hand image generators 202, 202' towards the user's eyes 204, 204'. Two separate regions (one in each of the left and right optical paths) or a single region of the surface 208 (that is in both the left and right optical paths) may be coated with an optical coating to facilitate or enhance this reflection whilst maintaining transmission of the view of the outside environment.

Although it is not visible in FIG. 2A, the optical display system comprises supports that maintain the relative position between the first and second image generators 202, 202', intermediate reflective element 206 and surface 208. In various examples, these supports may be integral with the mechanism that makes the HMD wearable, e.g. they may all be attached to a helmet.

The optical element 206 may be located in the central portion such that at least one of the microstructures is located substantially at the centre. A microstructure may be defined as being located in the centre if it is located less than the size of the microstructure from the central plane 210. A microstructure may be defined as being located in the centre if it is located less than or approximately equal to the average gap between microstructures from the central plane 210 The centre may be defined by the central plane 210. The centre may be defined by the central plane 210 Positioning the optical element 206 in the centre may allow a single optical element to be used comprising a single and/or contiguous array of microstructures, rather than two separate arrays of microstructures located in different positions. This may allow for a simpler manufacturing process and also a more compact design.

In some examples the intermediate optical element 206 may be configured to be out of a field of view of the user. Being located out of the field of view, means that there is no requirement to make the intermediate optical element 206 transparent or transmissive.

In Some Examples the Array of St

The HMD may further comprise a control system and/or other elements which are not shown in FIG. 2A. These additional elements may comprise passive display components, active display components, light sources or other devices used for image generation. Example active display components may be any active electronic display means e.g. CRT, LCoS, DMD, LCD or OLED, or the like. Example passive display components may be any transparent, translucent, semi-transparent, or reflective arrangement on or through which images are projected. Example light sources may be LEDs or laser diode emitters.

Figure 3:
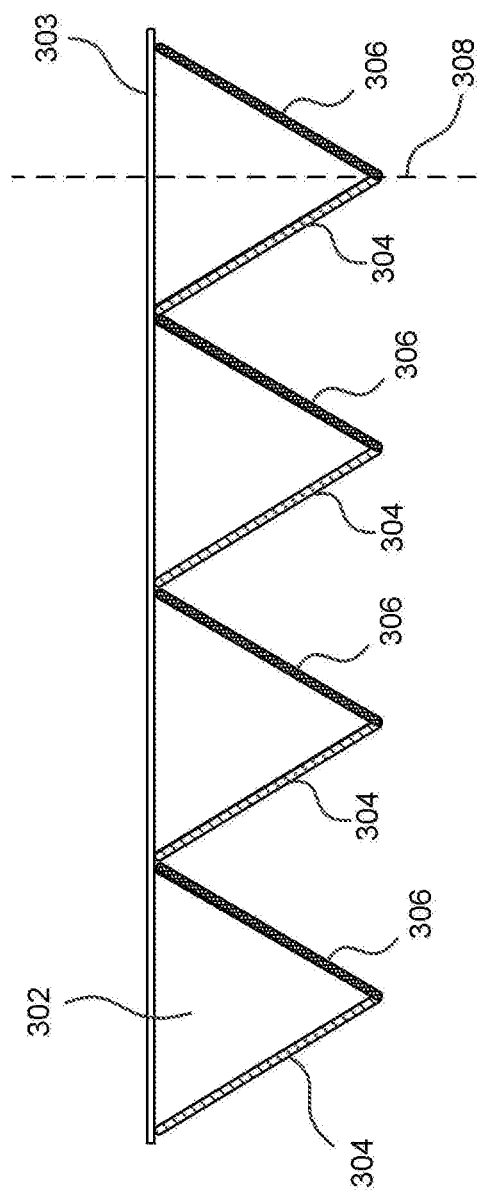
FIG. 3 shows a schematic diagram of an example intermediate reflective element.

FIG. 3 shows a schematic diagram of an example intermediate reflective element. The intermediate reflective element is a micro-structure element comprising a plurality (e.g. an array) of microstructures 302 and in the example shown in FIG. 3, these microstructures are triangular microstructures on a primary surface 303 which are shown in a top down or cross-sectional view. In the example shown, each micro-structure 302 comprises two facets 304, 306. The first facet 304 from each microstructure is arranged to reflect the image generated by one of the two image generators and forms part of the corresponding optical path and the second facet 306 from is arranged to reflect the image generated by the other of the two image generators and forms part of the other optical path. Each optical path therefore uses an independent (i.e. separate) portion of the microstructure and hence of the intermediate reflective element. In the example shown, each microstructure facet only reflects light as part of one of the optical paths.

In some examples the array of microstructures is continuous. In some examples the array of microstructures may cover the entire surface of the optical element 206.

Figure 4:
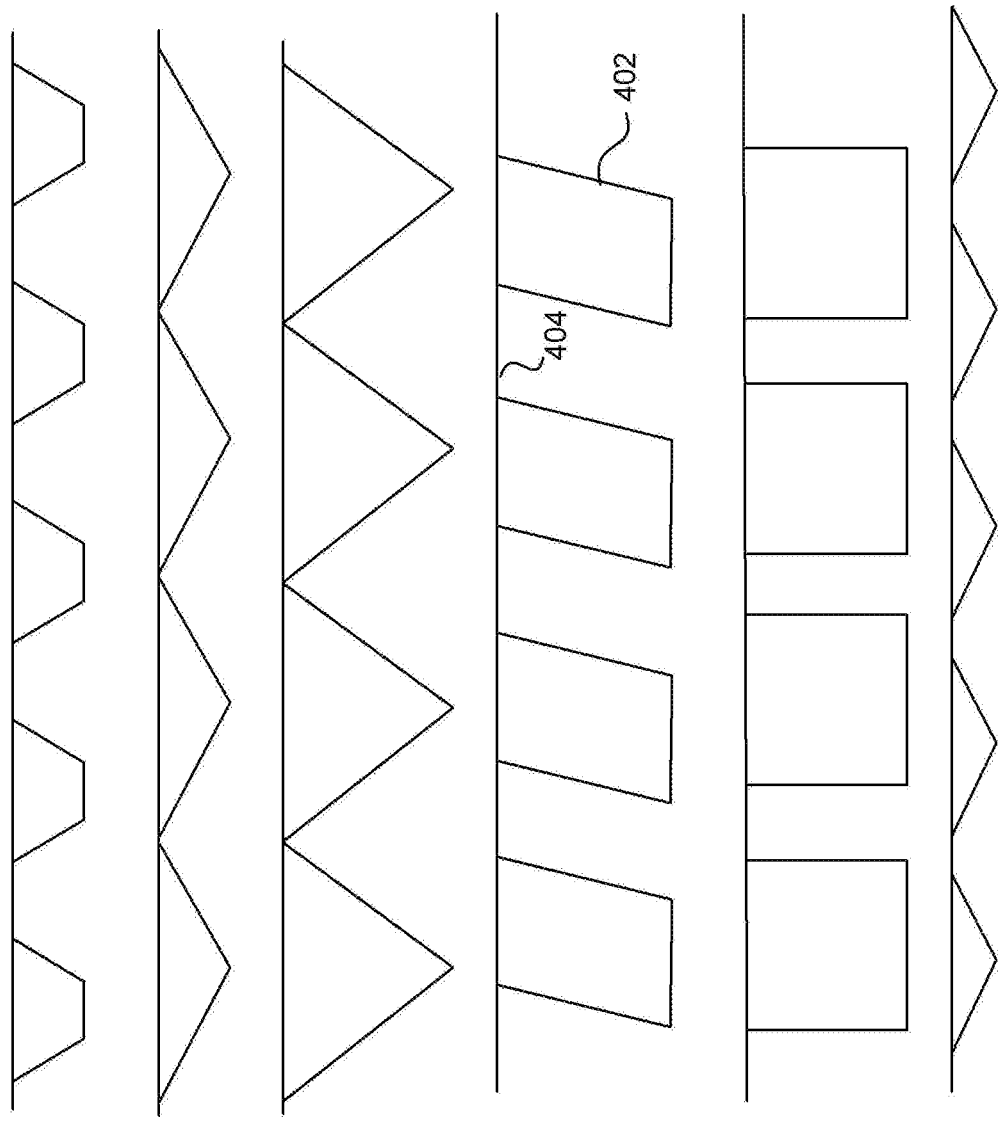
FIG. 4 shows schematic diagrams of various alternative example intermediate reflective elements.

FIG. 4 shows schematic diagrams of various alternative example intermediate reflective elements. As shown in FIG. 4, triangular microstructures with different angles may be used to create shallower or taller prismatic geometry. In other examples the microstructures may have different cross-sections, e.g. they may be square, trapezoids, slanted pillars, etc., and in some examples there may be flat areas (e.g. of the primary surface) between adjacent microstructures. In many examples, each microstructure has a symmetric cross-section (with the axis of symmetry being perpendicular to the base of the microstructure, as indicated by the dotted line 308 in FIG. 3); however in other examples, such as where the intermediate reflective element is positioned slightly off centre (whilst still being positioned substantially centrally), the microstructures may not have a symmetric cross-section. Depending upon the geometry of the microstructures (e.g. the number of facets and shape), the microstructures may induce multiple or double reflections, e.g. firstly from the side of the structures (e.g. side 402) and secondly from the flat at the base of the structure (e.g. flat 404).

Furthermore, whilst the example intermediate reflective elements shown in FIGS. 3 and 4 each comprise an array of identical microstructures, in other examples, the structures may vary or grade in size, shape, depth or angle across the primary surface of the intermediate reflective element.

The arrangement of microstructures, including the angles of the facets, is selected in combination the other optical components in the optical display system (including the surface 208) to provide the required folding geometry such that light that is emitted by the image generators 202, 202' is incident on the user's eyes.

Figure 5:
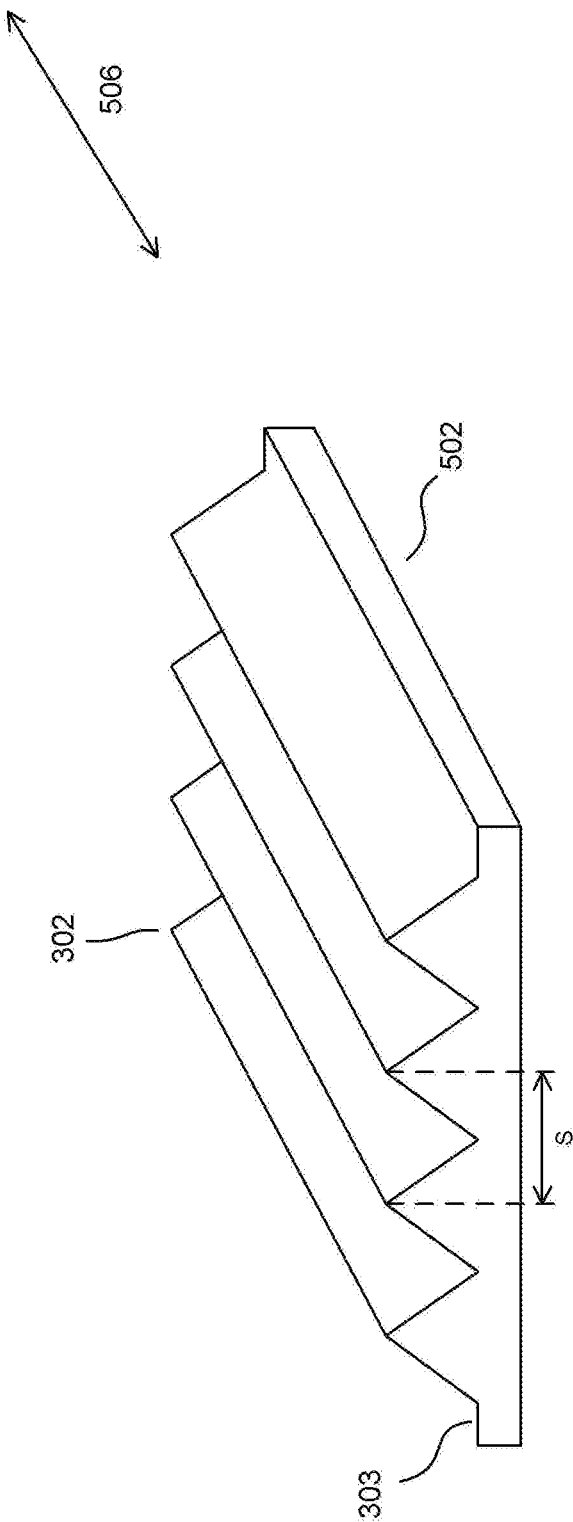
FIG. 5 shows a perspective view of an example intermediate reflective element comprising triangular microstructures.
Figure 6:
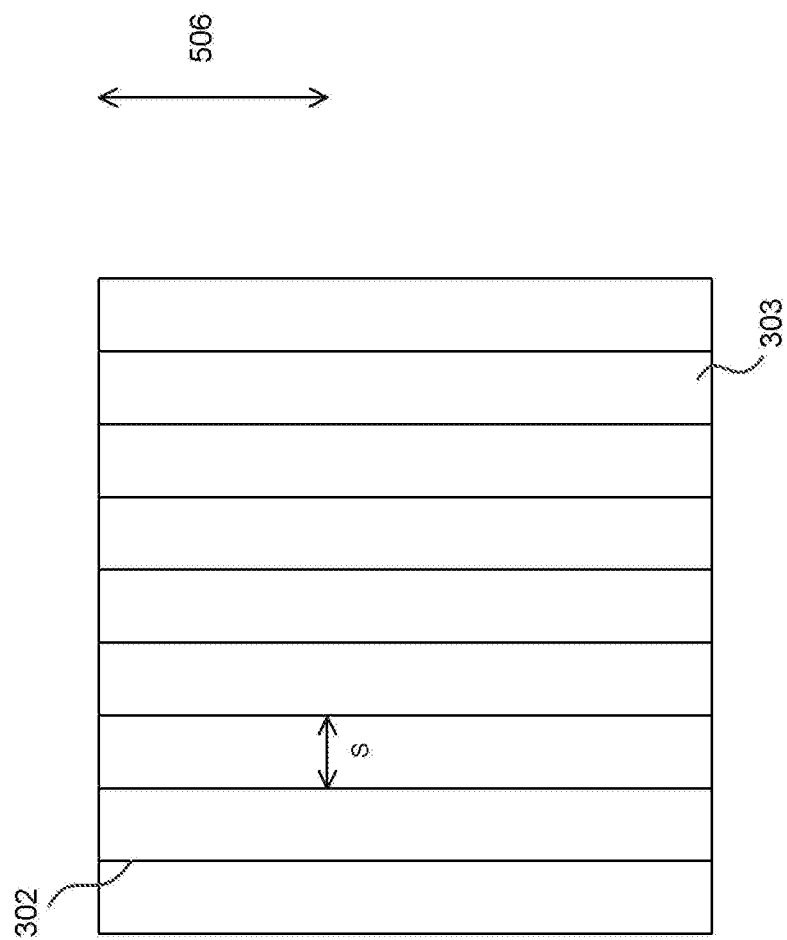
FIG. 6 shows an enlarged face-on view of an example intermediate reflective element.

Whilst FIGS. 3 and 4 show top-down views or cross-sections through example intermediate reflective elements (and the microstructures that form such an intermediate reflective element), FIG. 5 shows a perspective view of an example intermediate reflective element 502 comprising triangular microstructures (although in practice, such a reflective element may comprise many more than four microstructures) and FIG. 6 shows an enlarged face-on view of an example intermediate reflective element. As shown in FIGS. 5 and 6, the intermediate reflective element comprises an array of microstructures 302 arranged parallel to each other in a regular, linear pattern across the surface 303 with the microstructures extending along what is the vertical (or substantially vertical) direction 506 when in use (as indicated by the double ended arrows in FIGS. 5 and 6). In other examples, the spacing of the microstructures within the linear pattern may not be regular (e.g. the spacing, s, may vary across the intermediate reflective element). In various examples, the shape, size and pitch of the microstructures may be computer designed in order to provide a required folding of the optical path for a particular HMD implementation.

Figure 7:
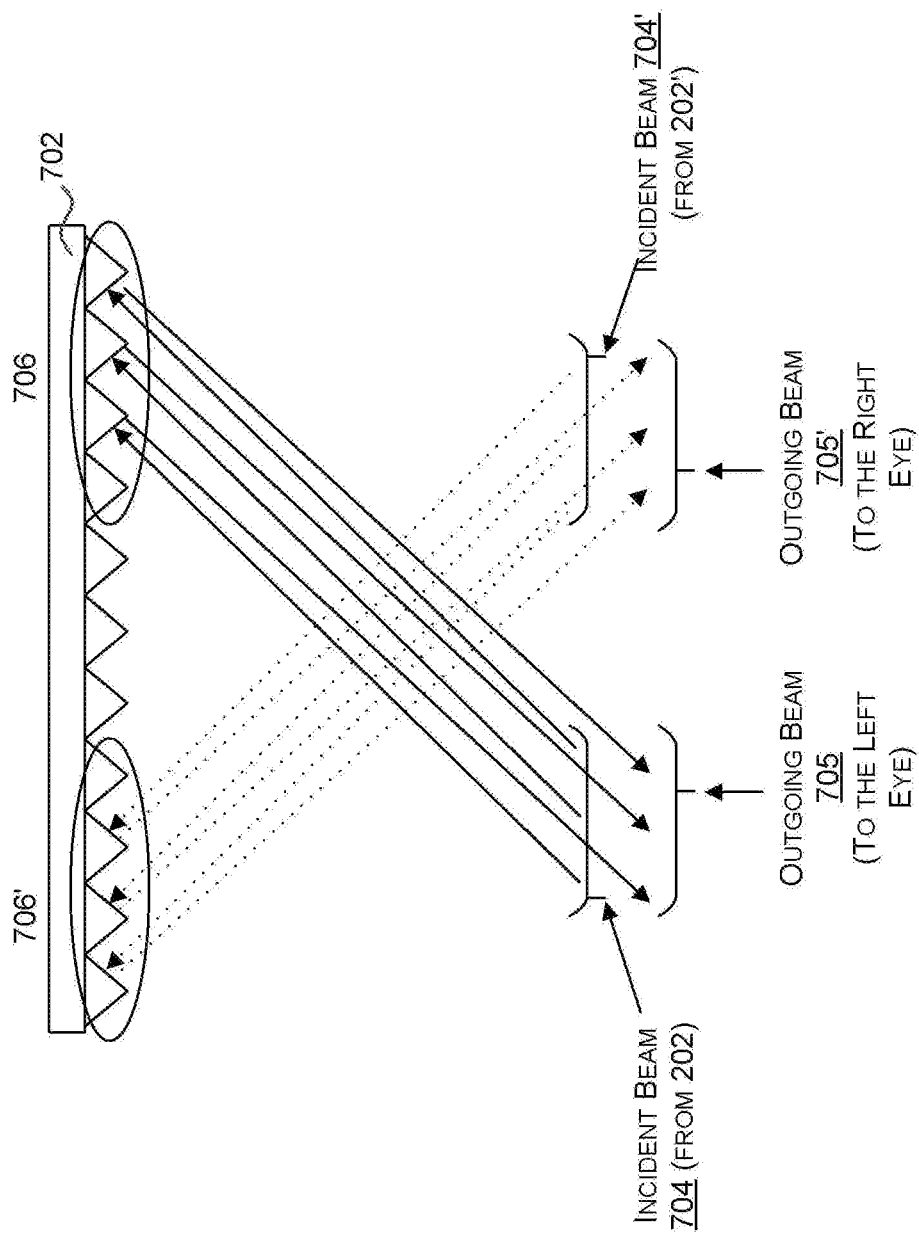
FIG. 7 is a schematic diagram which shows the operation of an example intermediate reflective element comprising triangular microstructures.

FIG. 7 is a schematic diagram which shows the operation of an example intermediate reflective element 702 comprising triangular microstructures 302. FIG. 7 shows two incident beams 704 and 704', one output respectively from each of the first and second image generators 202, 202' and these beams 704, 704' are respectively directed toward a first region 706 of the intermediate reflective element 702 and a second region 706' of the intermediate reflective element 702. The first and second regions 706, 706' may be separated from each other (as shown in FIG. 7) or may overlap. However, even in examples where the first and second regions 706, 706' overlap, the facets that reflect each of the beams are different. In various examples, the beams 504 and 504' cross one another before reaching their respective first and second regions 706, 706, of the intermediate reflective element 702. Each incident beam 704, 704' is reflected by a subset of the facets in the respective region 706, 706', resulting in two reflected beams 705, 705'.

In an example, the intermediate reflective element 702 as shown in FIG. 7 may be approximately 50 mm long and 50 mm wide. Alternatives are equally applicable and may include different shapes and sizes. In an example, the microstructures 302 may be 0.5 mm high and 1 mm wide each and arranged with a pitch of 1 line/mm. Appreciably the size and dimensions of the microstructure will be optimised dependent upon application, and various feature sizes could be utilised within the millimetre to micron scale range.

Using a microstructure element for the intermediate reflective element, instead of two large mirrors aligned adjacent to one another reduces the size of the assembly required for folding the optical paths and allows the optical display system to fit into a more compact volume, whilst also not restricting the display field of view reflected through the optical display system.

In various examples, the facets of the microstructures may be naturally reflective (e.g. facets of a crystalline material, such as silicon), created from a polished material or coated with an optical coating so as to enhance reflection of incident light. In other examples, more complex thin film coating stacks may be used that allow angular and/or wavelength selective reflection. The microstructures may be formed from multiple materials for example glasses, polymers, metals or crystalline solids. The structures can be formed by known appropriate processes, for example machining or milling of metal substrates, chemical or physical etching of a silicon substrate, embossing of a plastic substrate or any other appropriate process for the chosen material.

In the examples shown in FIGS. 3-7, the intermediate reflective element comprises a substantially flat primary surface 303 with microstructures on one face, resulting in a surface relief (the dimensions of which may be exaggerated in the drawings so that the microstructures are more clearly shown). In other examples, the intermediate reflective element may be curved or have another predetermined form, again with microstructures on one face. The different substrate form may be used in conjunction with the microstructures to produce different optical characteristics over the face of the surface. For example the substrate could be curved to impart a level of optical power to the element.

Figure 2B:
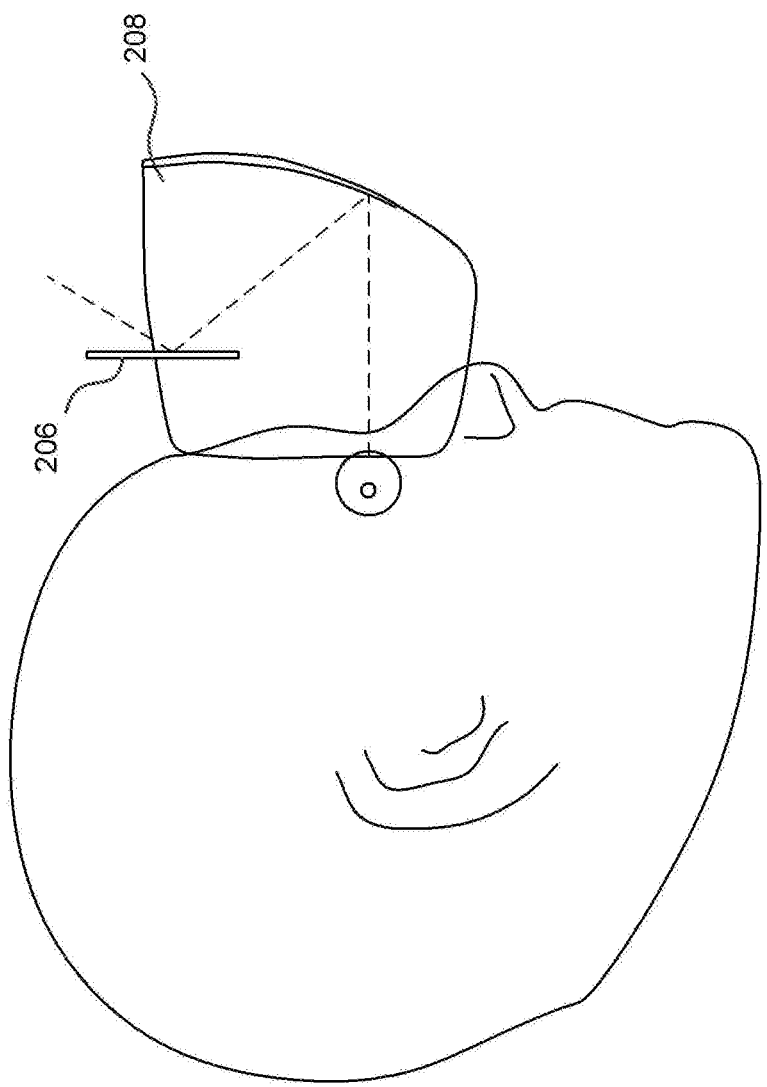

FIG. 2B shows a side view of the HMD 200 comprising an improved optical display system from FIG. 2A. As shown in FIG. 2B, the intermediate reflective element 206 may be positioned such that the surface with the microstructures on it faces away from the user. The incident beams from each of the image generators (e.g. beams 704, 704') travel in a direction which is towards the user's head until they are incident on the intermediate reflective element 206. The reflected beams (e.g. beams 705, 705') then travel away from the user's head until they are incident on the interior face of the surface 208 (e.g. visor). The surface 208 reflects these beams back into the user's eyes.

As described above and shown in FIG. 2A, there are separated optical paths for each eye and, unlike in the arrangement shown in FIG. 1A, these optical paths do not swap sides, i.e. the right-hand image generator projects images for the user's right eye and the left-hand image generator projects images for the user's left eye. This arrangement, without optical paths that swap sides (as is the case in the arrangement of FIG. 1A), enables the direct optical coupling (or integration) of a binocular vision enhancement system to the display system, as is described in more detail below with reference to FIG. 10.

Figure 10:
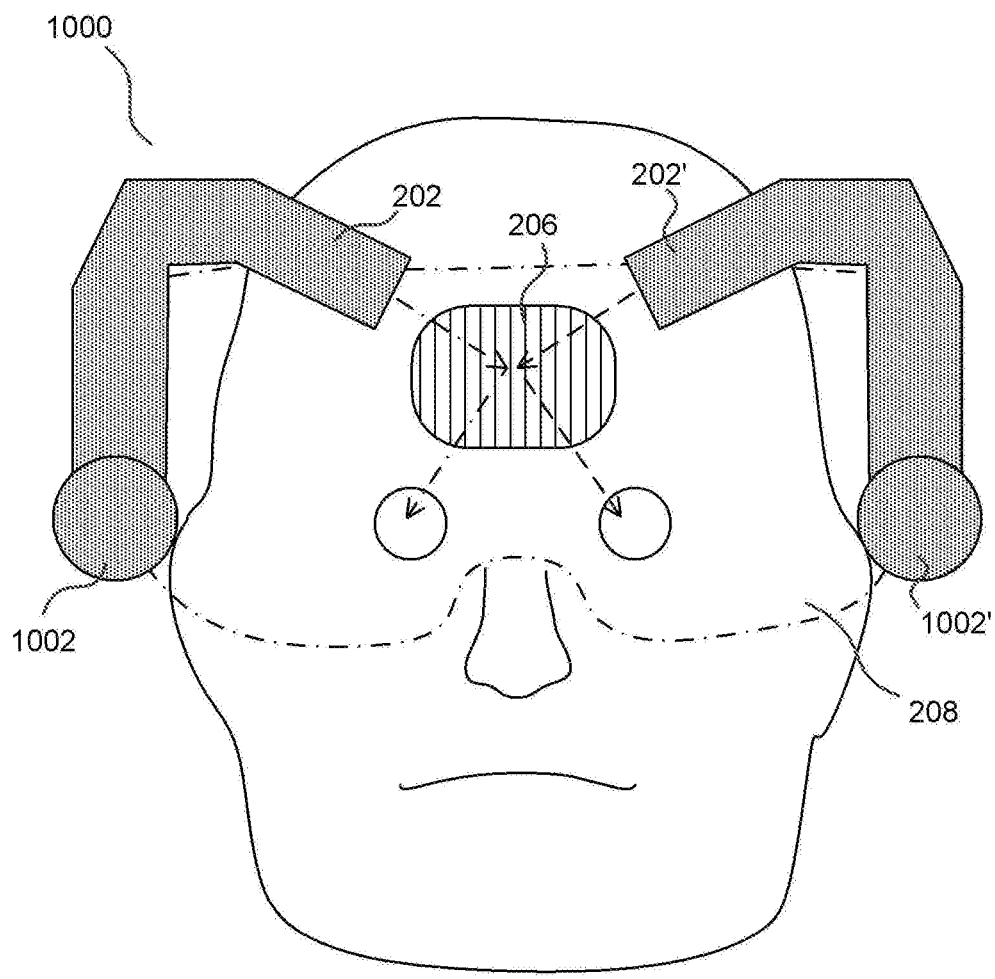
FIG. 10 shows an HMD comprising an improved optical display system and a vision enhancement system.

FIG. 10 shows an HMD 1000 comprising an improved optical display system and a vision enhancement system. In the example shown, the vision enhancement system comprises additional optical elements such as objective lenses 1002, 1002' and relay lenses mounted on the left and right sides of the HMD (as indicated by the shaded portions in FIG. 10), which are optically coupled to the left and right image generation optics. These additional optical elements in conjunction with active elements such as an image intensifier system enable an enhanced night vision viewing arrangement. In other examples any other optically coupled sensors or systems may be used. Through the use of the improved optical display system (and in particular the intermediate optical element 206) described herein, the image from the vision enhancement system on the right-hand side of the HMD is fed to the user's right eye and the image from the vision enhancement system on the left-hand side of the HMD is fed to the user's left eye. This provides a natural view to the user and reduces unpleasant optical effects that may cause eye fatigue or strain. In contrast, if the optical arrangement of FIG. 1A was used, the image from the vision enhancement system on the right-hand side of the HMD would be fed to the user's left eye and vice versa, thereby presenting an unnatural and unusable view to the user.

Figure 8:
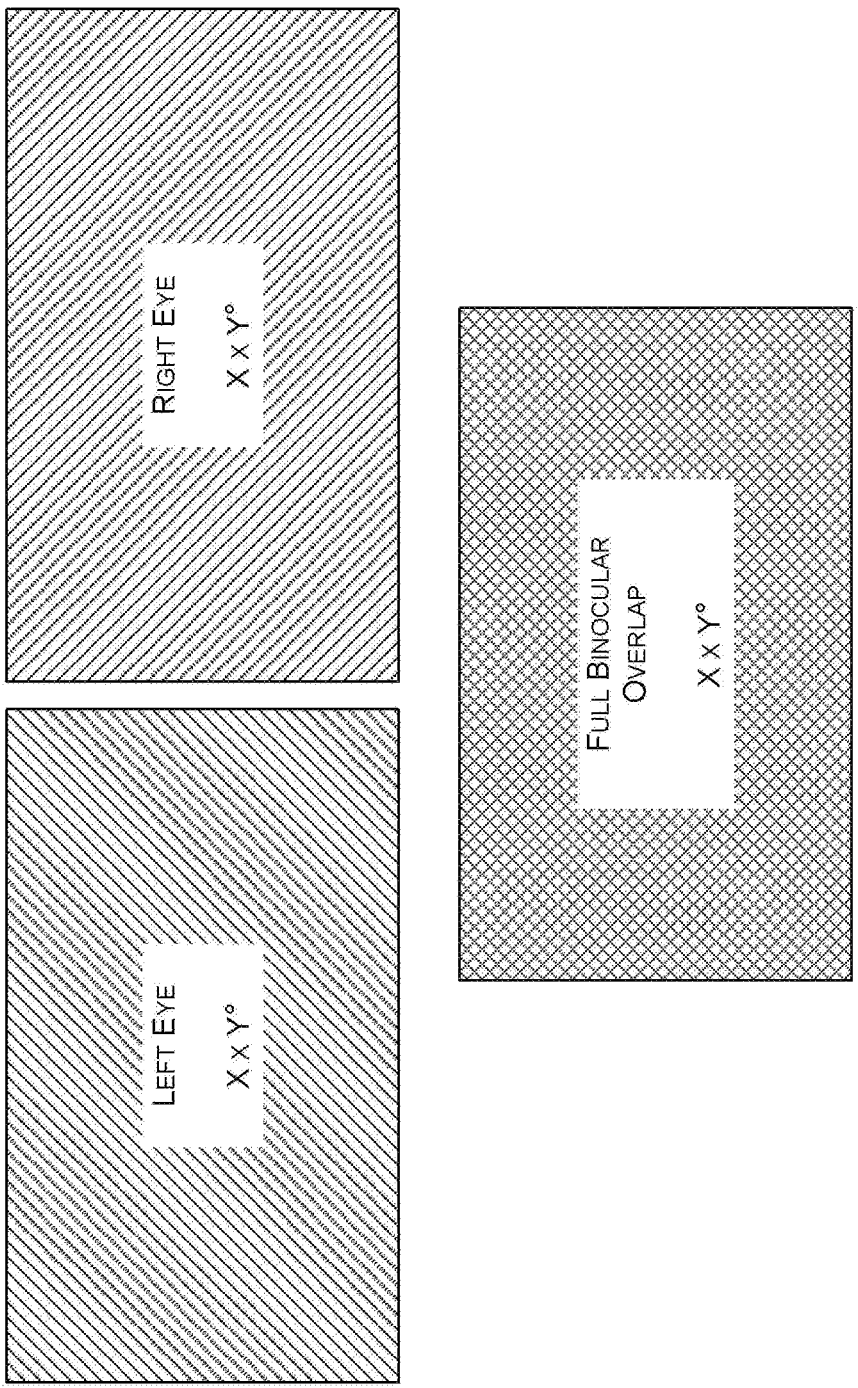
FIGS. 8 and 9 shows schematic diagrams of different optical arrangements resulting in different overlaps of fields of view.
Figure 9:
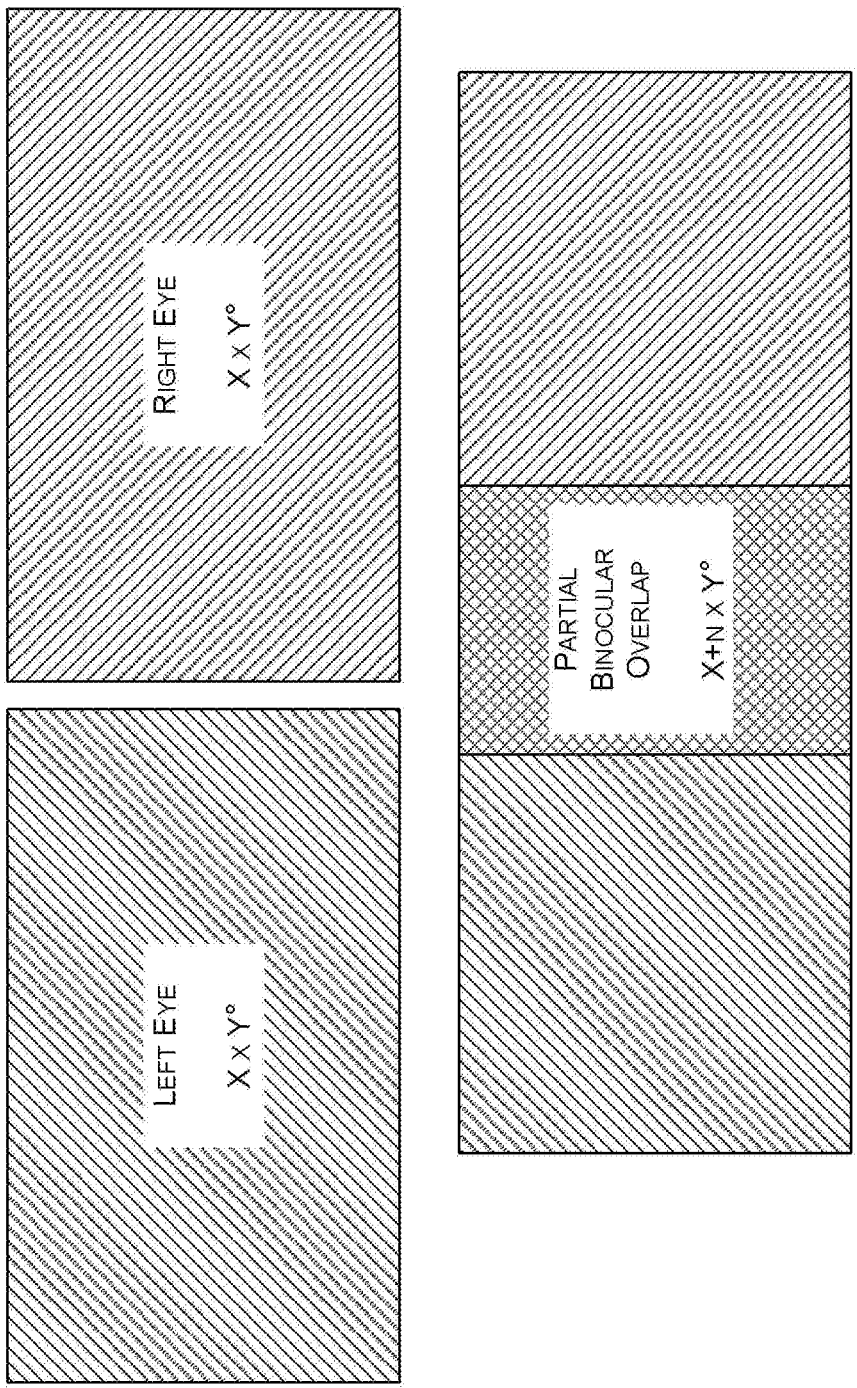

In various examples, the intermediate reflective element (and the microstructures it comprises) may be arranged to provide a symmetric system in which the field of view from each image generator 202, 202' is the same and the projected light from each image generator follows an optical path which has the same properties (e.g. length, angles of reflection at the intermediate reflective element, etc.) with the exception of the mirroring between left and right hands, such that there is full binocular overlap, as shown in FIG. 8. By using the microstructure element as the intermediate reflective element, in other examples, the two optical paths may have different properties and/or the fields of view of the two image generators may not totally overlap and as a result the optical display system may provide a wider, non-overlapped field of view, as shown in FIG. 9. As shown in FIG. 9, each optical path provides an offset field of view and there is only partial binocular overlap.

The HMD described herein may be used in many different situations, for example automotive or aeronautic applications military applications, engineering, medicine, gaming or in any general application for viewing media and the like.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality. In the claims, the term 'comprising' or "including" does not exclude the presence of other elements.

The invention claimed is:

1. An optical display system comprising:
   a first image generator for projecting a first image along a first optical path, the first optical path comprising a first region of a surface;
   a second image generator for projecting a second image along a second optical path, the second optical path comprising a second region of the surface; and
   an optical element positioned in both the first and second optical paths between the image generators and the surface;
   wherein the first image generator is positioned to the left of a central plane passing through the surface;
   wherein the second image generator is positioned to the right of the central plane passing through the surface;
   wherein the first and second regions of the surface are reflective and arranged to respectively reflect the light emitted by the first image generator towards a user's left eye position and the light emitted by the second image generator towards the user's right eye position;
   wherein the optical element comprises an array of microstructures on a primary surface, each microstructure comprising at least a first facet and a second facet, wherein the first facet from each of a first plurality of the microstructures is arranged to reflect the light emitted by the first image generator and forms part of the first optical path, and the second facet from each of a second plurality of the microstructures is arranged to reflect the light emitted by second image generator and forms part of the second optical path; and
   wherein the first facets are not part of the second optical path, and the second facets are not part of the first optical path.

2. The display system of claim 1, wherein the surface is a visor.

3. The display system of claim 1, wherein the first plurality of microstructures is the same as the second plurality of microstructures.

4. The display system of claim 1, wherein at least some of the microstructures are triangular in cross-section.

5. The display system of claim 1, wherein at least some of the microstructures are rectangular in cross-section.

6. The display system of claim 1, wherein at least some of the shaped microstructures form a saw-tooth cross-section.

7. The display system of claim 1, wherein the primary surface of the optical element has a flat profile.

8. The display system of claim 1, wherein a substrate of the optical element has a curved profile.

9. The display system of claim 1, wherein the optical element is located in a central portion of the display system between the first and second image generators.

10. The display system according to claim 9, wherein the optical element is located in the central portion such that at least one of the microstructures is located within a tolerance of the central plane, wherein the least one microstructure has a size and is located within the tolerance of the central plane if the least one microstructure is located less than the size of the microstructure from the central plane.

11. The display system of claim 1, wherein at least one of the first and second image generators comprises an interface for optically coupling an image from an additional imaging system.

12. The display system of claim 11, wherein the additional imaging system forms part of a vision enhancement system.

13. The display system of claim 12, wherein the vision enhancement system is a night vision enhancement system.

14. The display system of claim 1, wherein a field of view of the first image generator only partially overlaps a field of view of the second image generator.

15. The display system of claim 1, wherein the first and second optical paths are not symmetrical about the central plane passing through the surface.

16. The display system of claim 1, wherein the first and second regions of the surface are reflective such that the first and second reflections from the first and second regions are chromatically independent.

17. The display system of claim 1, wherein the optical element has a reflectively of over 90%.

18. The display system of claim 1, wherein the optical element is configured to be out of a field of view of the user.

19. An HMD comprising a display system of claim 1.

20. An optical element for use in an optical display system, the optical display system including a first image generator for projecting a first image along a first optical path and a second image generator for projecting a second image along a second optical path, the optical element comprising: an array of microstructures on a primary surface, each microstructure comprising at least a first facet and a second facet, wherein the first facet from each of a first plurality of the microstructures is arranged to reflect light output by the first image generator such that it forms part of the first optical path between the first image generator and a left eye of a user, and the second facet from each of a second plurality of the microstructures is arranged to reflect light output by the second image generator such that it forms part of the second optical path between the second image generator and a right eye of a user, and wherein the first facets are not part of the second optical path, and the second facets are not part of the first optical path.

21. A method, performed by an optical display system, the method comprising,
- providing, by a first image generator, a first image for projection along a first optical path to a user's left eye;
- providing, by a second image generator, a second image for projection along a second optical path to a user's right eye; and
- using an optical element positioned in both the first and second optical paths between the image generators and a surface to reflect the light output from the first image generator and the light output by the second image generator, wherein the optical element comprises an array of microstructures on a primary surface, each microstructure comprising at least a first facet and a second facet, wherein the first facet from each of a first plurality of the microstructures is arranged to reflect the light output from the first image generator and forms part of the first optical path, and the second facet from each of a second plurality of the microstructures is arranged to reflect the light output from the second image generator and forms part of the second optical path, and wherein the first facets are not part of the second optical path, and the second facets are not part of the first optical path.

* * * * *